United States Patent
Du et al.

(10) Patent No.: US 9,759,980 B2
(45) Date of Patent: Sep. 12, 2017

(54) COLOR DISPLAY DEVICE

(71) Applicant: E Ink California, Inc., Fremont, CA (US)

(72) Inventors: Hui Du, Milpitas, CA (US); HongMei Zang, Fremont, CA (US)

(73) Assignee: EINK CALIFORNIA, LLC, Fremont, CA (US)

( * ) Notice: Subject to any disclaimer, the term of this patent is extended or adjusted under 35 U.S.C. 154(b) by 0 days.

(21) Appl. No.: 14/989,534

(22) Filed: Jan. 6, 2016

(65) Prior Publication Data

US 2016/0116818 A1 Apr. 28, 2016

Related U.S. Application Data

(63) Continuation-in-part of application No. 14/256,768, filed on Apr. 18, 2014, now Pat. No. 9,285,649.

(60) Provisional application No. 61/813,551, filed on Apr. 18, 2013.

(51) Int. Cl.
*G02B 26/00* (2006.01)
*G02F 1/167* (2006.01)

(52) U.S. Cl.
CPC ...... *G02F 1/167* (2013.01); *G02F 2001/1678* (2013.01); *G02F 2203/34* (2013.01)

(58) Field of Classification Search
CPC ................ G02F 1/167; G02F 2203/34; G02F 2001/1678; G02F 2001/1676; G09G 3/344; G09G 3/2003; G09G 2300/0452
USPC .................................. 359/296, 900; 345/107
See application file for complete search history.

(56) References Cited

U.S. PATENT DOCUMENTS

| | | |
|---|---|---|
| 6,636,186 B1 | 10/2003 | Yamaguchi et al. |
| 6,781,745 B2 | 8/2004 | Chung et al. |
| 6,864,875 B2 | 3/2005 | Drzaic et al. |
| 7,038,655 B2 | 5/2006 | Herb et al. |
| 7,075,502 B1 | 7/2006 | Drzaic et al. |
| 7,292,386 B2 | 11/2007 | Kanbe |
| 7,312,916 B2 | 12/2007 | Pullen et al. |
| 7,345,810 B2 | 3/2008 | Chopra et al. |
| 7,382,521 B2 | 6/2008 | Chopra et al. |
| 7,433,113 B2 | 10/2008 | Chopra et al. |
| 7,609,435 B2 | 10/2009 | Moriyama et al. |
| 7,636,076 B2 | 12/2009 | Hung et al. |
| 7,652,656 B2 | 1/2010 | Chopra et al. |
| 7,656,576 B2 | 2/2010 | Suwabe et al. |
| 7,848,009 B2 | 12/2010 | Machida et al. |

(Continued)

FOREIGN PATENT DOCUMENTS

| | | |
|---|---|---|
| CN | 101075063 | 11/2007 |
| CN | 101989021 | 3/2011 |

(Continued)

OTHER PUBLICATIONS

PCT/US2014/034651 PCT Notification Of Transmittal Of The International Search Report And The Written Opinion Of The International Searching Authority, Or The Declaration, mailed on Aug. 21, 2014.

*Primary Examiner* — Tuyen Tra
(74) *Attorney, Agent, or Firm* — David J. Cole

(57) ABSTRACT

The present invention provides a realistic solution for a highlight or multicolor display device which can display high quality color states. More specifically, an electrophoretic fluid is provided which comprises four types of particles, having different levels of size, threshold voltage or charge intensity.

17 Claims, 3 Drawing Sheets

(56) References Cited

U.S. PATENT DOCUMENTS

| | | | |
|---|---|---|---|
| 8,040,594 B2 | 10/2011 | Paolini, Jr. et al. |
| 8,054,288 B2 | 11/2011 | Sugita et al. |
| 8,067,305 B2 | 11/2011 | Zafiropoulo et al. |
| 8,068,090 B2 | 11/2011 | Machida et al. |
| 8,072,674 B2 | 12/2011 | Wang et al. |
| 8,081,375 B2 | 12/2011 | Komatsu et al. |
| 8,115,729 B2 | 2/2012 | Danner et al. |
| 8,174,491 B2 | 5/2012 | Machida et al. |
| 8,441,713 B2 | 5/2013 | Kawashima et al. |
| 8,441,714 B2 | 5/2013 | Paolini, Jr. et al. |
| 8,477,404 B2 | 7/2013 | Moriyama et al. |
| 8,477,405 B2 | 7/2013 | Ishii et al. |
| 8,520,296 B2 | 8/2013 | Wang et al. |
| 8,565,522 B2 | 10/2013 | Swic |
| 8,570,639 B2 | 10/2013 | Masuzawa et al. |
| 8,574,937 B2 | 11/2013 | Shi |
| 8,629,832 B2 | 1/2014 | Tanabe |
| 8,670,174 B2 | 3/2014 | Sprague et al. |
| 8,674,978 B2 | 3/2014 | Komatsu et al. |
| 8,687,265 B2 | 4/2014 | Ahn et al. |
| 8,704,754 B2 | 4/2014 | Machida et al. |
| 8,717,662 B2 | 5/2014 | Komatsu |
| 8,717,664 B2 | 5/2014 | Wang et al. |
| 8,902,491 B2 | 12/2014 | Wang et al. |
| 8,963,903 B2 | 2/2015 | Sakamoto et al. |
| 8,964,282 B2 | 2/2015 | Wang et al. |
| 8,988,764 B2 | 3/2015 | Abe et al. |
| 9,013,516 B2 | 4/2015 | Sakamoto et al. |
| 9,052,564 B2 | 6/2015 | Sprague et al. |
| 9,285,649 B2 | 3/2016 | Du et al. |
| 2008/0042928 A1 | 2/2008 | Schlangen et al. |
| 2008/0062159 A1 | 3/2008 | Roh et al. |
| 2008/0117165 A1 | 5/2008 | Machida et al. |
| 2011/0134508 A1* | 6/2011 | Kawashima ............ G02F 1/167 359/296 |
| 2011/0175939 A1 | 7/2011 | Moriyama et al. |
| 2012/0194899 A1 | 8/2012 | Zhang |
| 2012/0299947 A1 | 11/2012 | Tsuda et al. |
| 2013/0278995 A1 | 10/2013 | Drzaic et al. |
| 2013/0300727 A1 | 11/2013 | Lin et al. |
| 2014/0340735 A1 | 11/2014 | Lin et al. |
| 2014/0340736 A1 | 11/2014 | Lin |
| 2014/0347407 A1 | 11/2014 | Wang et al. |
| 2015/0103394 A1 | 4/2015 | Wang et al. |
| 2015/0198858 A1 | 7/2015 | Chan et al. |
| 2015/0234250 A1 | 8/2015 | Lin et al. |
| 2016/0011484 A1 | 1/2016 | Chan et al. |
| 2016/0041448 A1 | 2/2016 | Lin et al. |

FOREIGN PATENT DOCUMENTS

| | | |
|---|---|---|
| JP | 2006343458 | 12/2006 |
| JP | 2007140129 | 6/2007 |
| JP | 2008033000 | 2/2008 |
| JP | 2008129179 | 6/2008 |
| JP | 2008209589 | 9/2008 |
| JP | 2009116041 | 5/2009 |
| JP | 2009192637 | 8/2009 |
| JP | 2010072617 | 4/2010 |
| JP | 2011158783 | 8/2011 |
| JP | 2010-128505 | 8/2013 |
| KR | 10-2007-0082680 | 8/2007 |
| KR | 10-2008-0023913 | 3/2008 |
| KR | 10-2011-0103765 | 9/2011 |
| KR | 10-2011-0112329 | 10/2011 |
| KR | 10-1232146 | 2/2013 |
| TW | 201022815 | 6/2010 |
| TW | 201022816 A | 6/2010 |
| TW | 201211978 A | 3/2012 |
| TW | 201239497 | 8/2012 |
| TW | 201237529 | 9/2012 |

* cited by examiner

COLOR DISPLAY DEVICE

This application is a continuation-in-part of U.S. application Ser. No. 14/256,768, filed Apr. 18, 2014 (Publication No. 2014/0313566, now U.S. Pat. No. 9,285,649); which claims the benefit of U.S. Provisional Application No. 61/813,551, filed Apr. 18, 2013. The above applications are incorporated herein by reference in their entirety.

FIELD OF THE INVENTION

The present invention is directed to a color display device which can display high quality color states, and an electrophoretic fluid for such an electrophoretic display.

BACKGROUND OF THE INVENTION

In order to achieve a color display, color filters are often used. The most common approach is to add color filters on top of black/white sub-pixels of a pixelated display to display the red, green and blue colors. When a red color is desired, the green and blue sub-pixels are turned to the black state so that the only color displayed is red. When a blue color is desired, the green and red sub-pixels are turned to the black state so that the only color displayed is blue. When a green color is desired, the red and blue sub-pixels are turned to the black state so that the only color displayed is green. When the black state is desired, all three-sub-pixels are turned to the black state. When the white state is desired, the three sub-pixels are turned to red, green and blue, respectively, and as a result, a white state is seen by the viewer.

The biggest disadvantage of such a technique is that since each of the sub-pixels has a reflectance of about one third of the desired white state, the white state is fairly dim. To compensate this, a fourth sub-pixel may be added which can display only the black and white states, so that the white level is doubled at the expense of the red, green or blue color level (where each sub-pixel is only one fourth of the area of the pixel). Brighter colors can be achieved by adding light from the white pixel, but this is achieved at the expense of color gamut to cause the colors to be very light and unsaturated. A similar result can be achieved by reducing the color saturation of the three sub-pixels. Even with this approach, the white level is normally substantially less than half of that of a black and white display, rendering it an unacceptable choice for display devices, such as e-readers or displays that need well readable black-white brightness and contrast.

SUMMARY OF THE INVENTION

Figure 1:
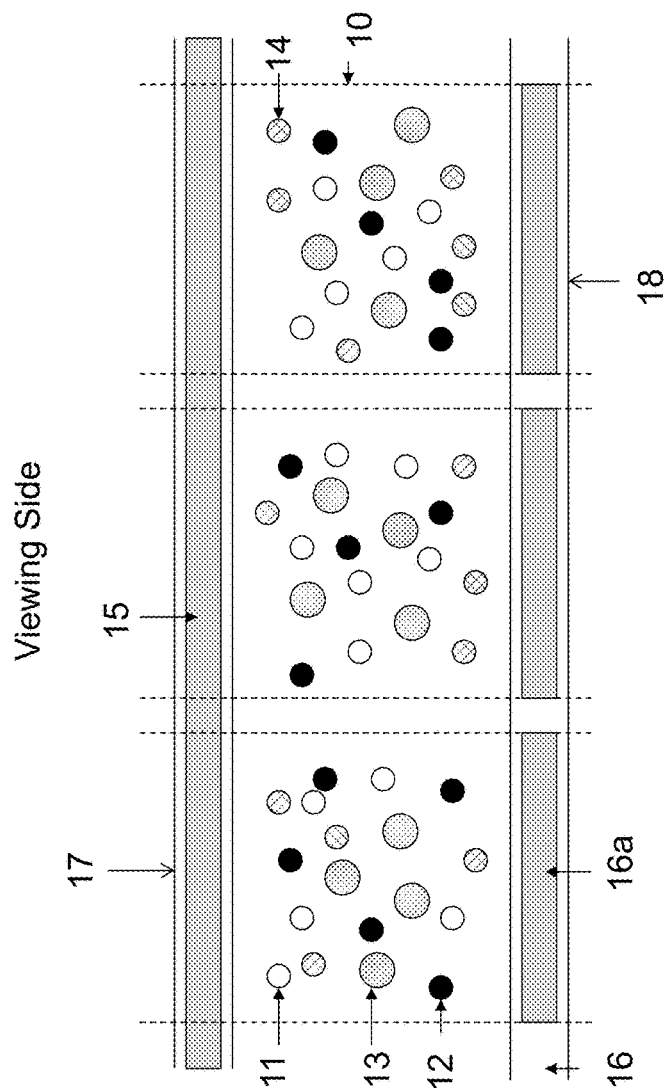
FIG. 1 depicts an electrophoretic display device of the present invention.

The present invention not only provides a realistic solution for a color display device which can display highly saturated color states, but also eliminates the need of color filters.

One aspect of the present invention is directed to a display layer comprising an electrophoretic medium and having a first surface on the viewing side and a second surface on the opposite side of the first surface, the electrophoretic medium which is sandwiched between a common electrode and a layer of pixel electrodes comprises a first type of particles, a second type of particles, a third type of particles and a fourth type of particles which is additive particles, all dispersed in a solvent or solvent mixture, the first, second and third types of particles having respectively first, second and third optical characteristics differing from one another, the first type of particles having a charge of one polarity and the second, third and fourth types of particles having charges of the opposite polarity, and the second type of particles having an electric field threshold, such that:

(a) application of a voltage potential difference between the common electrode and a pixel electrode to generate an electric field stronger than the electric field threshold and the voltage potential difference having the same polarity as the second type of particles, will cause a pixel corresponding to the pixel electrode to display the second optical characteristic at the first surface;

(b) application of a voltage potential difference between the common electrode and a pixel electrode to generate an electric field stronger than the electric field threshold and the voltage potential difference having the same polarity as the first type of particles, will cause a pixel corresponding to the pixel electrode to display the first optical characteristic at the first surface; and (c) once the first optical characteristic is displayed at the first surface, application of a voltage potential difference between the common electrode and a pixel electrode to generate an electric field weaker than the electric field threshold and the voltage potential difference having the same polarity as the third type of particles, will cause a pixel corresponding to the pixel electrode to display the third optical characteristic at the first surface.

In one embodiment, the first type of particles and the second type of particles are of the white and black colors, respectively. In one embodiment, the third type of particles is non-white and non-black. In one embodiment, the third type of particles is of a color selected from the group consisting red, green and blue, magenta, yellow and cyan. In one embodiment, the third type of particles is larger than the first or the second type of particles. In one embodiment, the third type of particles is about 2 to about 50 times the sizes of the first or second type of particles. In one embodiment, the fourth type of particles is white. In one embodiment, the optical characteristic is color state.

In one embodiment, the electrophoretic medium is filled in display cells and sandwiched between a common electrode and a layer of pixel electrodes. In one embodiment, the display cells are cup-like microcells. In one embodiment, the display cells are microcapsules. In one embodiment, the display cells are aligned with the pixel electrodes. In one embodiment, the display cells are not aligned with the pixel electrodes. In one embodiment, the third type of particles is of the same color in all display cells. In one embodiment, the third type of particles is of different colors in display cells.

In one embodiment, a pixel is driven by an electric field between the common electrode and a corresponding pixel electrode.

Another aspect of the present invention is directed to a driving method for a display layer comprising an electrophoretic medium and having a first surface on the viewing side and a second surface on the opposite side of the first surface, the electrophoretic medium which is sandwiched between a common electrode and a layer of pixel electrodes comprises a first type of particles, a second type of particles, a third type of particles and a fourth type of particles which is additive particles, all dispersed in a solvent or solvent mixture, the first, second and third types of particles having respectively first, second and third optical characteristics differing from one another, the first type of particles having a charge of one polarity and the second, third and fourth types of particles having charges of the opposite polarity, and the second type of particles having an electric field threshold, which method comprises:

(a) applying a voltage potential difference between the common electrode and a pixel electrode to generate an electric field stronger than the electric field threshold and the voltage potential difference having the same polarity as the second type of particles to cause a pixel corresponding to the pixel electrode to display the second optical characteristic at the first surface;

(b) applying a voltage potential difference between the common electrode and a pixel electrode to generate an electric field stronger than the electric field threshold and the voltage potential difference having the same polarity as the first type of particles to cause a pixel corresponding to the pixel electrode to display the first optical characteristic at the first surface; and (c) once the first optical characteristic is displayed at the first surface, applying a voltage potential difference between the common electrode and a pixel electrode to generate an electric field weaker than the electric field threshold and the voltage potential difference having the same polarity as the third type of particles to cause a pixel corresponding to the pixel electrode to display the third optical characteristic at the first surface.

In one embodiment, in step (c), the voltage potential difference is applied for not longer than 30 seconds. In one embodiment, in step (c), the voltage potential difference is applied for not longer than 15 seconds.

Another aspect of the present invention is directed to a driving method for a display layer comprising an electrophoretic medium and having a first surface on the viewing side and a second surface on the opposite side of the first surface, the electrophoretic medium which is sandwiched between a common electrode and a layer of pixel electrodes comprises a first type of particles, a second type of particles, a third type of particles and a fourth type of particles which is additive particles, all dispersed in a solvent or solvent mixture, the first, second and third types of particles having respectively first, second and third optical characteristics differing from one another, the first type of particles having a charge of one polarity and the second, third and fourth types of particles having charges of the opposite polarity, and the second type of particles having an electric field threshold, which method comprises driving a pixel from a color state of the first type of particles to a color state of the third type of particles by applying an electric field which is weaker than the electric field threshold of the second type of particles.

In one embodiment, when the color of the third type of particles is seen at a viewing side, the first and second types of particles gather at the side opposite of the viewing side resulting in an intermediate color between the colors of the first and second types of particles.

DETAILED DESCRIPTION OF THE INVENTION

An electrophoretic fluid of present invention comprises four types of particles dispersed in a dielectric solvent or solvent mixture. For ease of illustration, the four types of particles may be referred to as a first type of particles, a second type of particles, a third type of particles and a fourth type of particles. The fourth type of particles is additive particles. The term "electrophoretic fluid" may also be referred to as "electrophoretic medium".

As an example shown in FIG. 1, the first type of particles is the white particles (11), the second type of particles is the black particles (12), the third type of particles is the colored particles (13) and the fourth type of particles is the additive particles (14). The colored particles (13) are non-white and non-black particles.

It is understood that the scope of the invention broadly encompasses fluids comprising particles of any colors as long as among the four types of particles, three types (i.e., the first type of particles, the second type of particles and the third type of particles) have visually distinguishable colors.

For white particles, they may be formed from an inorganic pigment, such as $TiO_2$, $ZrO_2$, $ZnO$, $Al_2O_3$, $Sb_2O_3$, $BaSO_4$, $PbSO_4$ or the like.

For black particles, they may be formed from CI pigment black 26 or 28 or the like (e.g., manganese ferrite black spinel or copper chromite black spinel) or carbon black.

The third type of particles may be of a color such as red, green, blue, magenta, cyan or yellow. The pigments for this type of particles may include, but are not limited to, CI pigment PR 254, PR122, PR149, PG36, PG58, PG7, PB28, PB15:3, PY138, PY150, PY155 and PY20. These are commonly used organic pigments described in color index handbooks, "New Pigment Application Technology" (CMC Publishing Co, Ltd, 1986) and "Printing Ink Technology" (CMC Publishing Co, Ltd, 1984). Specific examples include Clariant Hostaperm Red D3G 70-EDS, Hostaperm Pink E-EDS, PV fast red D3G, Hostaperm red D3G 70, Hostaperm Blue B2G-EDS, Hostaperm Yellow H4G-EDS, Hostaperm Green GNX, BASF Irgazine red L 3630, Cinquasia Red L 4100 HD, and Irgazin Red L 3660 HD; Sun Chemical phthalocyanine blue, phthalocyanine green, diarylide yellow or diarylide AAOT yellow.

In addition to the colors, the first, second and third types of particles may have other distinct optical characteristics, such as optical transmission, reflectance, luminescence or, in the case of displays intended for machine reading, pseudo-color in the sense of a change in reflectance of electromagnetic wavelengths outside the visible range.

The fourth type of particles (i.e., additive particles) has color blocking and/or color enhancing properties, and therefore they may also be referred to as "color enhancing" particles. The additive particles may be of any color and they only serve to enhance the color of other particles. In other words, a display device utilizing a display fluid of the present invention does not display a color state of the fourth type of particles (i.e., additive particles).

The additive particles are usually white. The white additive particles may be formed from an inorganic pigment, such as $TiO_2$, $ZrO_2$, $ZnO$, $Al_2O_3$, $Sb_2O_3$, $BaSO_4$, $PbSO_4$ or the like. These pigments are suitable because they have high refractive index and light scattering effect. In one embodiment of the present invention, after surface treatment, the additive particles will have similar or same charge polarity and mobility as the third type of particles (i.e., the colored particles). Therefore the additive particles will move together with, or very closely follow, the colored particles under an electric field. As a result, the additive particles can help block the colors of the first type of particles and the second type of particles from being seen from the viewing side. This improves the hiding power of the third type of particles (i.e., the colored particles) and also enhances the brightness of the color state displayed by the colored particles.

The additive particles are particularly useful when the colored particles are formed of an organic pigment which has relatively poor hiding power and coloring strength. An example of this would be yellow pigment PY154 which has weak hiding power, and when such a yellow pigment is used for the colored particles, the white additive particles can provide the yellow pigment better hiding power and higher brightness.

A display layer utilizing the display fluid of the present invention has two surfaces, a first surface (17) on the viewing side and a second surface (18) on the opposite side of the first surface (17). The display fluid is sandwiched between the two surfaces. On the side of the first surface (17), there is a common electrode (15) which is a transparent electrode layer (e.g., ITO), spreading over the entire top of the display layer. On the side of the second surface (18), there is an electrode layer (16) which comprises a plurality of pixel electrodes (16a).

The pixel electrodes are described in U.S. Pat. No. 7,046,228, the content of which is incorporated herein by reference in its entirety. It is noted that while active matrix driving with a thin film transistor (TFT) backplane is mentioned for the layer of pixel electrodes, the scope of the present invention encompasses other types of electrode addressing as long as the electrodes serve the desired functions.

Each space between two dotted vertical lines in FIG. 1 denotes a pixel (10). As shown, each pixel has a corresponding pixel electrode. An electric field is created for a pixel by the potential difference between a voltage applied to the common electrode and a voltage applied to the corresponding pixel electrode.

The percentages of the four types of particles in the fluid may vary. As an example, in a fluid of black/white/colored/additive particles, the black particle may take up about 0.1% to 10%, preferably 0.5% to 5%, by volume of the electrophoretic fluid; the white particle may take up about 1% to 50%, preferably 5% to 15%, by volume of the fluid; and the colored particles may take up 2% to 20%, preferably 4% to 10%, by volume of the fluid. The percentage of the additive particles (14) can be 0.1% to 5%, preferably 0.5% to 3%, by volume of the electrophoretic fluid.

The solvent in which the three types of particles are dispersed is clear and colorless. It preferably has a low viscosity and a dielectric constant in the range of about 2 to about 30, preferably about 2 to about 15 for high particle mobility. Examples of suitable dielectric solvent include hydrocarbons such as isopar, decahydronaphthalene (DECALIN), 5-ethylidene-2-norbornene, fatty oils, paraffin oil, silicon fluids, aromatic hydrocarbons such as toluene, xylene, phenylxylylethane, dodecylbenzene or alkylnaphthalene, halogenated solvents such as perfluorodecalin, perfluorotoluene, perfluoroxylene, dichlorobenzotrifluoride, 3,4,5-trichlorobenzotri fluoride, chloropentafluoro-benzene, dichlorononane or pentachlorobenzene, and perfluorinated solvents such as FC-43, FC-70 or FC-5060 from 3M Company, St. Paul Minn., low molecular weight halogen containing polymers such as poly(perfluoropropylene oxide) from TCI America, Portland, Oreg., poly(chlorotrifluoroethylene) such as Halocarbon Oils from Halocarbon Product Corp., River Edge, N.J., perfluoropolyalkylether such as Galden from Ausimont or Krytox Oils and Greases K-Fluid Series from DuPont, Delaware, polydimethylsiloxane based silicone oil from Dow-corning (DC-200).

The first and second types of particles carry opposite charge polarities. The third and fourth types of particles have the same charge polarity as one of the first and second types of particles. In a fluid of black/white/colored/additive particles, if the black particles are positively charged and the white particles are negatively charged, then both the colored and additive particles may be either positively charged or negatively charged.

In addition, the charges carried by the colored and additive may be weaker than the charges carried by the black and white particles. The term "weaker charge" is intended to refer to the charge of the particles being less than about 50%, preferably about 5% to about 30%, of the charge of the stronger charged particles.

The charge potentials of the particles may be measured in terms of zeta potential. In one embodiment, the zeta potential is determined by Colloidal Dynamics AcoustoSizer IIM with a CSPU-100 signal processing unit, ESA EN# Attn flow through cell (K:127). The instrument constants, such as density of the solvent used in the sample, dielectric constant of the solvent, speed of sound in the solvent, viscosity of the solvent, all of which at the testing temperature (25° C.) are entered before testing. Pigment samples are dispersed in the solvent (which is usually a hydrocarbon fluid having less than 12 carbon atoms), and diluted to be 5-10% by weight. The sample also contains a charge control agent (SOLSPERSE® 17000, available from Lubrizol Corporation, a Berkshire Hathaway company), with a weight ratio of 1:10 of the charge control agent to the particles. The mass of the diluted sample is determined and the sample is then loaded into the flow-through cell for determination of the zeta potential.

The four types of particles may also have varying sizes. In one embodiment, one or two types of the four types of particles may be larger than the other types. It is noted that among the four types of particles, the colored particles preferably have a larger size. For example, both the black and white particles are relatively small and their sizes (tested through dynamic light scattering) may range from about 50 nm to about 800 nm and more preferably from about 200 nm to about 700 nm, and the colored particles which have a weaker charge, preferably are about 2 to about 50 times and more preferably about 2 to about 10 times the average sizes of the black or white particles. The fourth type of particles (i.e., additive particles) may be of any size.

In the present invention, at least one type of particles may demonstrate an electric field threshold. In one embodiment, one type of the higher charged particles has an electric field threshold.

The term "electric field threshold", in the context of the present invention, is defined as the maximum electric field that may be applied for a period of time (typically not longer than 30 seconds, preferably not longer than 15 seconds), to a group of particles, without causing the particles to appear at the viewing side of a pixel, when the pixel is driven from a color state different from the color state of the group of particles. The term "viewing side", in the present application, refers to the first surface in a display layer where images are seen by the viewers.

The electric field threshold is either an inherent characteristic of the charged particles or an additive-induced property.

In the former case, the electric field threshold is generated, relying on certain attraction force between oppositely charged particles or between particles and certain substrate surfaces.

In the case of additive-induced electric field threshold, a threshold agent which induces or enhances the threshold characteristics of an electrophoretic fluid may be added. The threshold agent may be any material which is soluble or dispersible in the solvent or solvent mixture of the electrophoretic fluid and carries or induces a charge opposite to that of the charged particles. The threshold agent may be sensitive or insensitive to the change of applied voltage. The term "threshold agent" may broadly include dyes or pigments, electrolytes or polyelectrolytes, polymers, oligomers, surfactants, charge controlling agents and the like.

Additional information relating to the threshold agent may be found in U.S. Pat. No. 8,115,729, the content of which is incorporated herein by reference in its entirety.

The following is an example illustrating the present invention.

Example

Figure 2:
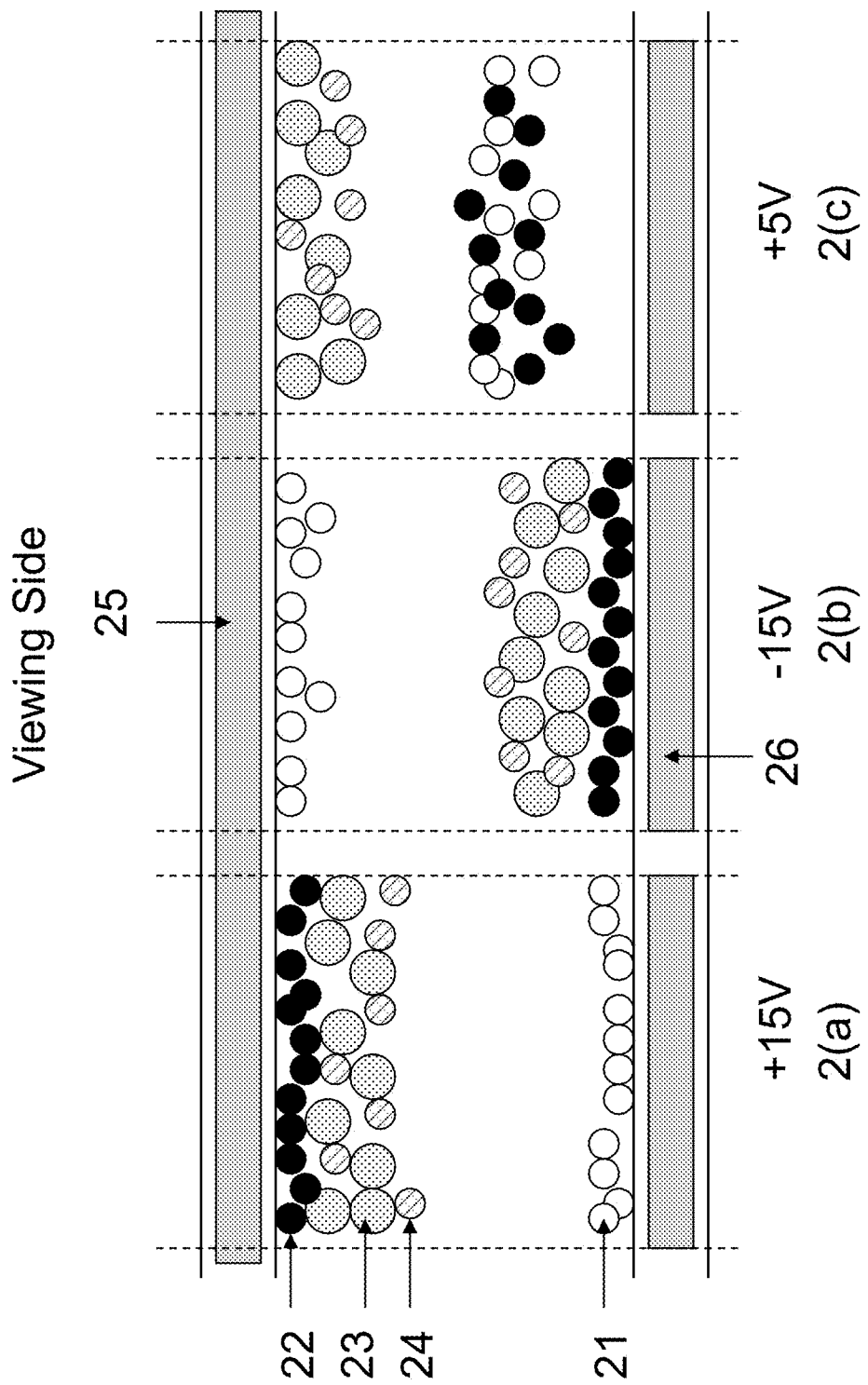
FIG. 2 demonstrates an example of the present invention.

This example is demonstrated in FIG. 2. The black particles (22) are assumed to have an electric field threshold. Therefore, the black particles (22) would not move to the viewing side if an applied electric field is weaker than the electric field threshold.

The white particles (21) are negatively charged while the black particles (22) are positively charged, and both types of particles are smaller than the colored particles (23). It is assumed, for illustration purpose, that the colored particles (23) are of the yellow color and the additive particles (24) are of the white color.

The yellow particles (23) and the white additive particles (24) carry the same charge polarity as the black particles which have the electric field threshold, but they carry a weaker charge than the black particles. As a result, the black particles move faster than the yellow particles (23) and the white additive particles (24) because of the stronger charge carried by the black particles, when an applied electric field is greater than the electric field threshold of the black particles.

In FIG. 2a, the applied voltage potential difference is +15V. In this case, an electric field generated by the applied driving voltage is greater than the electric field threshold, and therefore it causes the white particles (21) to move to be near or at the pixel electrode (26) and the black particles (22), the yellow particles (23) and the white additive particles (24) to move to be near or at the common electrode (25). As a result, a black color is seen at the viewing side. The yellow particles (23) and the white additive particles (24) move towards the common electrode (25); however because they carry weaker charges, they move slower than the black particles.

In FIG. 2b, when a voltage potential difference of −15V is applied. In this case, an electric field generated has an opposite polarity and it is also greater than the electric field threshold. As a result, it causes the white particles (21) to move to be near or at the common electrode (25) and the black particles (22), the yellow particles (23) and the white additive particles (24) to move to be near or at the pixel electrode (26). Consequently, a white color is seen at the viewing side.

The yellow particles (23) and the white additive particles (24) move towards the pixel electrode because they are also positively charged. However, because they carry weaker charges, they move slower than the black particles.

In FIG. 2c, the applied voltage potential difference changes to +5V. In this case, an electric field generated is weaker than the electric field threshold and therefore it causes the negatively charged white particles (21) in FIG. 2(b) to move towards the pixel electrode (26). The black particles (22) move little because of their electric field threshold. Due to the fact that the yellow particles (23) and the white additive particles (24) do not have a significant electric field threshold, they move to be near or at the common electrode (25) and as a result, the color of the yellow particles is seen at the viewing side and the white additive particles (24) block the black and white particles from being seen at the viewing side, thus enhancing the yellow color state.

Also as shown in FIG. 2(c), when the yellow particles and the white additive particles are at the common electrode side (i.e., the viewing side), the black and white particles are mixed at the non-viewing side, forming an intermediate color state (i.e., grey) between the white and black particles.

The electrophoretic fluid in an electrophoretic display device is filled in display cells. The display cells may be cup-like microcells as described in U.S. Pat. No. 6,930,818, the content of which is incorporated herein by reference in its entirety. The display cells may also be other types of micro-containers, such as microcapsules, microchannels or equivalents, regardless of their shapes or sizes. All of these are within the scope of the present application.

Figure 3:
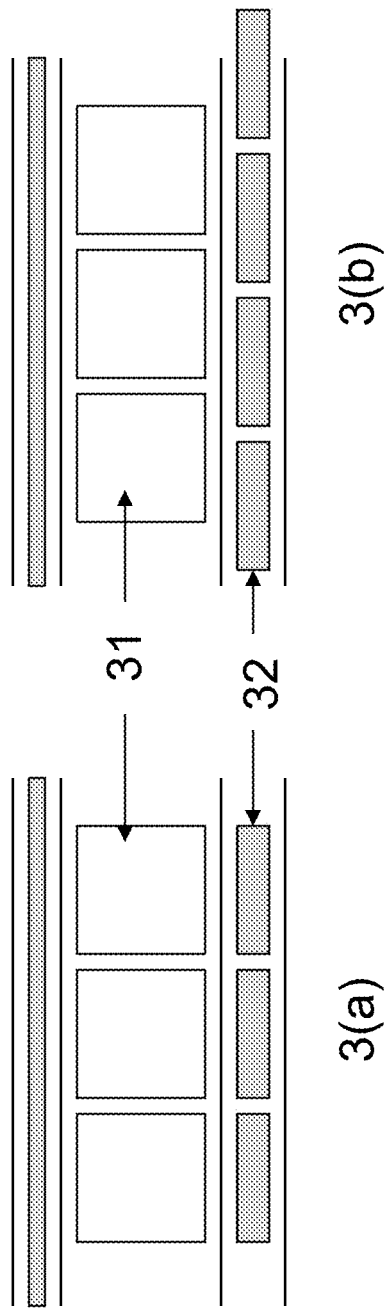
FIG. 3 shows two options where the display cells are aligned or unaligned, respectively, with the pixel electrodes.

In one embodiment of the present invention, the display device utilizing the present electrophoretic fluid is a high-light display device and in this embodiment, the colored particles are of the same color in all display cells. In this case, as shown in FIG. 3, the display cells (31) may be aligned with the pixel electrodes (32) (see FIG. 3a) or un-aligned with the pixel electrodes (see FIG. 3b).

In another embodiment, the display device utilizing the present electrophoretic fluid may be a multi-color display device. In this embodiment, the colored particles are of different colors in the display cells. In this embodiment, the display cells and the pixel electrodes are aligned.

While the present invention has been described with reference to the specific embodiments thereof, it should be understood by those skilled in the art that various changes may be made and equivalents may be substituted without departing from the nd scope of the invention. In addition, many modifications may be made to adapt a particular situation, materials, compositions, processes, process step or steps, to the objective, spirit and scope of the present invention. All such modifications are intended to be within the scope of the claims appended hereto.

What is claimed is:

1. A display layer comprising an electrophoretic medium and having a first surface on a viewing side and a second surface on the opposite side of the first surface; the electrophoretic medium sandwiched between a common electrode and a layer of pixel electrodes comprises a first type of particles, a second type of particles, a third type of particles and a fourth type of particles which are additive particles, all dispersed in a solvent or solvent mixture; the first, second and third types of particles having respectively first, second and third optical characteristics differing from one another; the first type of particles having a charge of one polarity and the second, third and fourth types of particles having charges of the opposite polarity, and the second type of particles having an electric field threshold; such that:
   (a) application of a voltage potential difference between the common electrode and a pixel electrode to generate an electric field stronger than the electric field threshold and the voltage potential difference having the same polarity as the second type of particles, will cause a pixel corresponding to the pixel electrode to display the second optical characteristic at the first surface;
   (b) application of a voltage potential difference between the common electrode and a pixel electrode to generate an electric field stronger than the electric field threshold and the voltage potential difference having the same polarity as the first type of particles, will cause a pixel corresponding to the pixel electrode to display the first optical characteristic at the first surface; and (c) once the first optical characteristic is displayed at the first surface, application of a voltage potential difference between the common electrode and a pixel electrode to generate an electric field weaker than the electric field threshold and the voltage potential difference having the same polarity as the third type of particles, will cause a pixel corresponding to the pixel electrode to display the third optical characteristic at the first surface.

2. The layer of claim 1, wherein the first type of particles and the second type of particles are of the white and black colors, respectively.

3. The layer of claim 1, wherein the third type of particles is non-white and non-black.

4. The layer of claim 3, wherein the third type of particles is of a color selected from the group consisting red, green and blue, magenta, yellow and cyan.

5. The layer of claim 1, wherein the third type of particles is larger than the first or the second type of particles.

6. The layer of claim 5, wherein the third type of particles is about 2 to about 50 times the sizes of the first or second type of particles.

7. The layer of claim 1, wherein the fourth type of particles is white.

8. The layer of claim 1, wherein the optical characteristic is color state.

9. The layer of claim 1, wherein the electrophoretic medium is filled in display cells.

10. The layer of claim 9, wherein the display cells are microcells.

11. The layer of claim 9, wherein the display cells are microcapsules.

12. The layer of claim 9, wherein the display cells are aligned with the pixel electrodes.

13. The layer of claim 9, wherein the display cells are not aligned with the pixel electrodes.

14. The layer of claim 9 wherein the third type of particles is of the same color in all display cells.

15. The layer of claim 9, wherein the third type of particles is of different colors in display cells.

16. The layer of claim 1, wherein in step (c), the voltage potential difference is applied for not longer than 30 seconds.

17. The layer of claim 16, wherein in step (c), the voltage potential difference is applied for not longer than 15 seconds.

* * * * *